United States Patent
Yang et al.

(10) Patent No.: US 7,428,279 B2
(45) Date of Patent: Sep. 23, 2008

(54) REDUCED COMPLEXITY SLIDING WINDOW BASED EQUALIZER

(75) Inventors: Rui Yang, Greenlawn, NY (US); Bin Li, Ronkonkoma, NY (US); Alexander Reznik, Titusville, NJ (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 697 days.

(21) Appl. No.: 10/791,244

(22) Filed: Mar. 2, 2004

(65) Prior Publication Data
US 2005/0031024 A1    Feb. 10, 2005

Related U.S. Application Data

(60) Provisional application No. 60/452,165, filed on Mar. 3, 2003.

(51) Int. Cl.
H03D 1/04    (2006.01)
(52) U.S. Cl. .................. 375/346; 375/285; 455/296; 327/310; 327/384; 327/551
(58) Field of Classification Search ............. 375/346, 375/285; 455/296; 327/310, 384, 551
See application file for complete search history.

(56) References Cited

U.S. PATENT DOCUMENTS

| | | | |
|---|---|---|---|
| 5,412,620 A | 5/1995 | Cafarella et al. | |
| 5,487,069 A | 1/1996 | O'Sullivan et al. | |
| 5,559,757 A | 9/1996 | Catipovic et al. | |
| 5,577,066 A | 11/1996 | Schuchman et al. | |
| 5,612,978 A | 3/1997 | Blanchard et al. | |
| 5,796,814 A | 8/1998 | Brajal et al. | |
| 5,805,638 A | 9/1998 | Liew | |
| 5,818,868 A | 10/1998 | Gaudenzi et al. | |
| 5,828,658 A | 10/1998 | Ottersten et al. | |
| 5,930,369 A | 7/1999 | Cox et al. | |
| 6,047,020 A | 4/2000 | Hottinen | |
| 6,097,753 A | 8/2000 | Ko | |

(Continued)

FOREIGN PATENT DOCUMENTS

EP    0 766 468 A2    4/1997

(Continued)

OTHER PUBLICATIONS

Benvenuto, "Joint detection with low computational complexity for hybrid TD-CDMA systems", VTC 1999 - Fall. IEEE VTS 50th Vehicular Technology Conference, 1999. vol. 1, Sep. 19-22, 1999 pp.: 618-622 vol. 1.*

(Continued)

*Primary Examiner*—Mohammed H. Ghayour
*Assistant Examiner*—Juan A. Torres
(74) *Attorney, Agent, or Firm*—Volpe and Koenig, P.C.

(57) ABSTRACT

A sliding window based data estimation is performed. An error is introduced in the data estimation due to the communication model modeling the relationship between the transmitted and received signals. To compensate for an error in the estimated data, the data that was estimated in a previous sliding window step or terms that would otherwise be truncated as noise are used. These techniques allow for the data to be truncated prior to further processing reducing the data of the window.

27 Claims, 6 Drawing Sheets

U.S. PATENT DOCUMENTS

| | | | |
|---|---|---|---|
| 6,128,276 A | 10/2000 | Agee |
| 6,137,843 A | 10/2000 | Chennakeshu et al. |
| 6,137,848 A | 10/2000 | Chennaksha et al. |
| 6,141,393 A | 10/2000 | Thomas et al. |
| 6,144,711 A | 11/2000 | Raleigh et al. |
| 6,181,714 B1 | 1/2001 | Isaksson et al. |
| 6,188,717 B1 | 2/2001 | Kaiser et al. |
| 6,219,561 B1 | 4/2001 | Raleigh |
| 6,289,005 B1 | 9/2001 | Katz |
| 6,320,903 B1 | 11/2001 | Isaksson et al. |
| 6,321,066 B1 | 11/2001 | Katz et al. |
| 6,321,082 B1 | 11/2001 | Katz |
| 6,359,926 B1 | 3/2002 | Isaksson et al. |
| 6,359,938 B1 | 3/2002 | Keevill et al. |
| 6,363,128 B1 | 3/2002 | Isaksson et al. |
| 6,366,554 B1 | 4/2002 | Isaksson et al. |
| 6,377,632 B1 | 4/2002 | Paulraj et al. |
| 6,392,595 B1 | 5/2002 | Katz et al. |
| 6,396,801 B1 | 5/2002 | Upton et al. |
| 6,438,174 B1 | 8/2002 | Isaksson et al. |
| 6,445,342 B1 | 9/2002 | Thomas et al. |
| 6,456,649 B1 | 9/2002 | Isaksson et al. |
| 6,466,629 B1 | 10/2002 | Isaksson et al. |
| 6,473,449 B1 | 10/2002 | Cafarella et al. |
| 6,473,453 B1 | 10/2002 | Wilkinson |
| 6,493,395 B1 | 12/2002 | Isaksson et al. |
| 6,505,053 B1 | 1/2003 | Winters et al. |
| 6,512,737 B1 | 1/2003 | Agee |
| 6,538,986 B2 | 3/2003 | Isaksson et al. |
| 6,553,012 B1 | 4/2003 | Katz |
| 6,611,855 B1 | 8/2003 | Hellberg et al. |
| 6,618,431 B1 | 9/2003 | Lee |
| 6,643,526 B1 | 11/2003 | Katz |
| 6,658,619 B1 | 12/2003 | Chen |
| 6,662,024 B2 | 12/2003 | Walton et al. |
| 6,671,334 B1 | 12/2003 | Kuntz et al. |
| 6,674,795 B1 | 1/2004 | Liu et al. |
| 6,680,969 B1 | 1/2004 | Molnar et al. |
| 6,684,065 B2 | 1/2004 | Bult et al. |
| 6,693,953 B2 | 2/2004 | Cox et al. |
| 6,700,919 B1 | 3/2004 | Papasakellarious |
| 6,724,743 B1 | 4/2004 | Pigeonnat |
| 6,729,929 B1 | 5/2004 | Sayers et al. |
| 6,744,320 B2 | 6/2004 | Nguyen et al. |
| 6,745,352 B2 | 6/2004 | Cheng |
| 6,757,321 B2 | 6/2004 | Pan et al. |
| 6,760,388 B2 | 7/2004 | Ketchum et al. |
| 2001/0033614 A1 | 10/2001 | Hudson |
| 2001/0049295 A1 | 12/2001 | Matsuoka et al. |
| 2001/0055319 A1 | 12/2001 | Quigley et al. |
| 2002/0034191 A1 | 3/2002 | Shattil |
| 2002/0097784 A1 | 7/2002 | Brunel et al. |
| 2002/0118765 A1 | 8/2002 | Nangia et al. |
| 2002/0119803 A1 | 8/2002 | Bitterlich et al. |
| 2002/0122406 A1 | 9/2002 | Chillariga et al. |
| 2002/0122465 A1 | 9/2002 | Agee et al. |
| 2002/0126741 A1 | 9/2002 | Baum et al. |
| 2002/0126768 A1 | 9/2002 | Isaksson et al. |
| 2002/0136158 A1* | 9/2002 | Frank ................... 370/209 |
| 2002/0145989 A1 | 10/2002 | De Parthapratim et al. |
| 2002/0159415 A1 | 10/2002 | Pan et al. |
| 2002/0159506 A1 | 10/2002 | Alamouti et al. |
| 2002/0159537 A1 | 10/2002 | Crilly, Jr. |
| 2002/0186715 A1 | 12/2002 | Mestdagh |
| 2003/0003880 A1 | 1/2003 | Ling et al. |
| 2003/0004697 A1 | 1/2003 | Ferris |
| 2003/0008684 A1 | 1/2003 | Ferris |
| 2003/0021237 A1 | 1/2003 | Min et al. |
| 2003/0021365 A1 | 1/2003 | Min et al. |
| 2003/0022651 A1 | 1/2003 | Bannasch et al. |
| 2003/0022680 A1 | 1/2003 | Shreve |
| 2003/0026201 A1 | 2/2003 | Amesen |
| 2003/0035392 A1 | 2/2003 | Pan et al. |
| 2003/0035491 A1 | 2/2003 | Walton et al. |
| 2003/0043732 A1 | 3/2003 | Walton et al. |
| 2003/0043767 A1 | 3/2003 | Pan et al. |
| 2003/0043887 A1 | 3/2003 | Hudson |
| 2003/0043925 A1 | 3/2003 | Stopler et al. |
| 2003/0048856 A1 | 3/2003 | Ketchum et al. |
| 2003/0058952 A1 | 3/2003 | Webster et al. |
| 2003/0063557 A1 | 4/2003 | Mottier |
| 2003/0072291 A1 | 4/2003 | Brunel |
| 2003/0076900 A1 | 4/2003 | Magee et al. |
| 2003/0076908 A1 | 4/2003 | Huang et al. |
| 2003/0081781 A1 | 5/2003 | Jensen et al. |
| 2003/0086366 A1 | 5/2003 | Branlund et al. |
| 2003/0099216 A1 | 5/2003 | Nilsson et al. |
| 2003/0103584 A1 | 6/2003 | Bjerke et al. |
| 2003/0108117 A1 | 6/2003 | Ketchum et al. |
| 2003/0112880 A1 | 6/2003 | Walton et al. |
| 2003/0123384 A1 | 7/2003 | Agee |
| 2003/0125040 A1 | 7/2003 | Walton et al. |
| 2003/0128658 A1 | 7/2003 | Walton et al. |
| 2003/0129984 A1 | 7/2003 | Dent |
| 2003/0133403 A1 | 7/2003 | Castelain et al. |
| 2003/0147655 A1 | 8/2003 | Shattil |
| 2003/0152021 A1 | 8/2003 | Wang et al. |
| 2003/0165131 A1 | 9/2003 | Liang et al. |
| 2003/0185310 A1 | 10/2003 | Ketchum et al. |
| 2003/0210752 A1* | 11/2003 | Krupka ................... 375/340 |
| 2003/0215003 A1 | 11/2003 | Mottier |
| 2003/0216154 A1 | 11/2003 | Mennenga et al. |
| 2003/0227866 A1 | 12/2003 | Yamaguchi |
| 2003/0235255 A1 | 12/2003 | Ketchum et al. |
| 2004/0032354 A1 | 2/2004 | Knobel et al. |
| 2004/0032918 A1 | 2/2004 | Shor et al. |
| 2004/0052236 A1 | 3/2004 | Hwang et al. |
| 2004/0086027 A1 | 5/2004 | Shattil |
| 2004/0086035 A1 | 5/2004 | Upton et al. |
| 2004/0087275 A1 | 5/2004 | Sugar et al. |
| 2004/0095907 A1 | 5/2004 | Agee et al. |
| 2004/0100897 A1 | 5/2004 | Shattil |
| 2004/0101046 A1 | 5/2004 | Yang et al. |
| 2004/0116077 A1 | 6/2004 | Lee et al. |
| 2004/0120274 A1 | 6/2004 | Petre et al. |
| 2004/0120424 A1 | 6/2004 | Roberts |
| 2004/0136399 A1 | 7/2004 | Roberts |
| 2004/0141548 A1 | 7/2004 | Shattil |
| 2004/0142663 A1 | 7/2004 | Roberts |
| 2004/0146024 A1 | 7/2004 | Li et al. |
| 2004/0240595 A1* | 12/2004 | Raphaeli ................... 375/350 |

FOREIGN PATENT DOCUMENTS

| | | |
|---|---|---|
| EP | 0766468 | 4/1997 |
| EP | 1 017 183 A2 | 7/2000 |
| EP | 1017183 | 7/2000 |
| EP | 1 047 209 A1 | 10/2000 |
| EP | 1047209 | 10/2000 |
| EP | 1 063 780 A2 | 12/2000 |
| EP | 1063780 | 12/2000 |
| EP | 1 119 146 A2 | 7/2001 |
| EP | 1119146 | 7/2001 |
| EP | 1 139 632 A1 | 10/2001 |
| EP | 1139623 | 10/2001 |
| EP | 1 175 022 A2 | 1/2002 |
| EP | 1175022 | 1/2002 |
| EP | 1 255 387 A1 | 11/2002 |
| EP | 1255387 | 11/2002 |
| EP | 1 289 182 A2 | 3/2003 |
| EP | 1289182 | 3/2003 |
| EP | 1 300 999 A1 | 4/2003 |
| EP | 1 303 094 A2 | 4/2003 |
| EP | 1300999 | 4/2003 |

| | | |
|---|---|---|
| EP | 1303094 | 4/2003 |
| EP | 1 357 693 A1 | 10/2003 |
| EP | 1357693 | 10/2003 |
| EP | 1 365 554 A1 | 11/2003 |
| EP | 1365554 | 11/2003 |
| EP | 1 379 020 A1 | 1/2004 |
| EP | 1379020 | 1/2004 |
| EP | 1 411 693 A3 | 4/2004 |
| EP | 1411693 | 4/2004 |
| KR | 1992-0009249 | 5/1992 |
| KR | 1998-702348 | 7/1998 |
| KR | 20000027178 | 5/2000 |
| KR | 2003-0034260 | 5/2003 |
| WO | 95/22859 | 8/1995 |
| WO | 95/27349 | 10/1995 |
| WO | 96/22638 | 7/1996 |
| WO | 97/34421 | 9/1997 |
| WO | 97/35384 | 9/1997 |
| WO | 97/48192 | 12/1997 |
| WO | 98/09395 | 3/1998 |
| WO | 98/10545 | 3/1998 |
| WO | 98/10549 | 3/1998 |
| WO | 98/10550 | 3/1998 |
| WO | 98/10552 | 3/1998 |
| WO | 98/10553 | 3/1998 |
| WO | 98/10554 | 3/1998 |
| WO | 98/10555 | 3/1998 |
| WO | 98/18272 | 4/1998 |
| WO | 98/36596 | 8/1998 |
| WO | 98/36598 | 8/1998 |
| WO | 98/36599 | 8/1998 |
| WO | 98/37638 | 8/1998 |
| WO | 99/49602 | 9/1999 |
| WO | 99/62280 | 12/1999 |
| WO | 00/11823 | 3/2000 |
| WO | 00/52872 | 9/2000 |
| WO | 01/10065 | 2/2001 |
| WO | 01/10065 A1 | 2/2001 |
| WO | 01/33761 | 5/2001 |
| WO | 01/33761 A1 | 5/2001 |
| WO | 01/33791 | 5/2001 |
| WO | 01/33791 A1 | 5/2001 |
| WO | 01/47202 | 6/2001 |
| WO | 01/47202 A2 | 6/2001 |
| WO | 01/47203 | 6/2001 |
| WO | 01/47203 A2 | 6/2001 |
| WO | 01/53932 | 7/2001 |
| WO | 01/53932 A2 | 7/2001 |
| WO | 01/54300 | 7/2001 |
| WO | 01/54300 A2 | 7/2001 |
| WO | 01/54305 | 7/2001 |
| WO | 01/54305 A2 | 7/2001 |
| WO | 02/054537 | 7/2001 |
| WO | 02/09977 | 4/2002 |
| WO | 02/29977 A2 | 4/2002 |
| WO | 02/054537 A1 | 7/2002 |
| WO | 02/054601 | 7/2002 |
| WO | 02/054601 A1 | 7/2002 |
| WO | 02/061962 | 8/2002 |
| WO | 02/061962 A1 | 8/2002 |
| WO | 02/067527 | 8/2002 |
| WO | 02/067527 A2 | 8/2002 |
| WO | 02/073937 | 9/2002 |
| WO | 02/073937 A2 | 9/2002 |
| WO | 02/080483 | 10/2002 |
| WO | 02/080483 A1 | 10/2002 |
| WO | 02/082683 | 10/2002 |
| WO | 02/082683 A2 | 10/2002 |
| WO | WO02/082683 A2 | 10/2002 |
| WO | 02/093779 | 11/2002 |
| WO | 02/093779 A2 | 11/2002 |
| WO | 02/093784 | 11/2002 |
| WO | 02/093784 A1 | 11/2002 |
| WO | 02/093819 | 11/2002 |
| WO | 02/093819 A1 | 11/2002 |
| WO | 03/005291 | 1/2003 |
| WO | 03/005291 A1 | 1/2003 |
| WO | 03/010898 | 2/2003 |
| WO | 03/010898 A1 | 2/2003 |
| WO | 03/015292 | 2/2003 |
| WO | 03/015292 A2 | 2/2003 |
| WO | 03/026237 | 3/2003 |
| WO | 03/026237 A2 | 3/2003 |
| WO | 03/028270 | 4/2003 |
| WO | 03/028270 A1 | 4/2003 |
| WO | 03/044983 | 5/2003 |
| WO | 03/044983 A2 | 5/2003 |
| WO | 03/081823 | 10/2003 |
| WO | 03/081823 A1 | 10/2003 |
| WO | 03/084092 | 10/2003 |
| WO | 03/084092 A2 | 10/2003 |
| WO | 03/092212 | 11/2003 |
| WO | 03/092212 A1 | 11/2003 |
| WO | 04/002047 A1 | 12/2003 |
| WO | 2004/002047 | 12/2003 |
| WO | 2004/003743 | 1/2004 |
| WO | 2004/003743 A1 | 1/2004 |
| WO | 2004/008704 | 1/2004 |
| WO | 2004/008704 A1 | 1/2004 |
| WO | 2004/023704 | 3/2004 |
| WO | 2004/023704 A2 | 3/2004 |
| WO | 2004/032347 | 4/2004 |
| WO | 2004/032347 A1 | 4/2004 |
| WO | 2004/036345 | 4/2004 |
| WO | 2004/036345 A2 | 4/2004 |
| WO | 2004/038984 | 5/2004 |
| WO | 2004/038984 A2 | 5/2004 |
| WO | 2004/059935 | 7/2004 |
| WO | 2004/059935 A1 | 7/2004 |
| WO | 2004/064298 | 7/2004 |
| WO | 2004/064298 A2 | 7/2004 |

OTHER PUBLICATIONS

"Fast Algorithm for Solving Toeplitz Systems of Equations", IBM Technical Disclosure Bulletin, May 1980, US, vol. 22 No. 12.
"Fast Algorithm for Solving Toeplitz Systems of Equations"_IBM Technical Disclosure Bulletin, May 1980, US, vol. 22. No. 12.
Vollmer et al., "Comparative Study of Joint-Detection Techniques for TD-CDMA Based Mobile Radio Systems", IEEE Journal on Selected Areas in Communications, vol. 19, No. 8, Aug. 2001, pp. 1461-1475.
Haykin, "Adaptive Filter Theory", Third Edition, Prentice Hall, 1996, pp. 87-93.
"Fast Algorithm for Solving Toeplitz Systems of Equations" _IBM Technical Disclosure Bulletin, May 1980, US, vol. 22. No. 12. 2 pages.
Beretta et al., "Space-Time multiuser detectors for TDD-UTRA". IEEE, Fall 2001.
Golub et al., "Matrix Computations," 3rd Edition, The Johns Hopkins University Press, Baltimore, MD, pp. 201-202, (1996).
Gray, "Toeplitz and Circulant Matrices: A Review," available at http://ee.stanford.edu/~gray/toeplitz.pdf.
Haykin, "Adaptive Filter Theory", Third Edition, Prentice Hall, 1996, pp. 87-93.
Kay, "Fundamentals of Statistical Signal Processing: Estimation Theory," Prentice Hall, New Jersey, XP002428399, (1993). pp. 391-392.
Meyr et al., "Digital Communication Receivers: Synchronization, Channel Estimation, and Signal Processing," Wiley Interscience, New York, XP002428398, pp. 700-717, 782-789, (1998).
Sinn et al., "Efficient Data Detection Algorithms in Single and Multi-Carrier Systems Without the Necessity of a Guard Period," p. 2739, left-hand column, figure 2.

Sun et al., "On the Convergence of the Inverses of Toeplitz Matrices and its Applications,"IEEE Transactions on Information Theory, vol. 49, No. 1, pp. 180-190, (Jan. 2003).

Vollmer et al., "Comparative Study of Joint-Detection Techniques for TD-CDMA Based Mobile Radio Systems", IEEE Journal on Selected Areas in Communications, vol. 19, No. 8, Aug. 2001, pp. 1461-1475.

Vollmer et al., "Joint-Detection using Fast Fourier Transforms in TD-CDMA based Mobile Radio Systems". 1999 (XP-002190679).

Williamson et al., "Block Decision Feedback Equalization," IEEE Transactions on Communications, IEEE Service Center, Piscataway, New Jersey, vol. 40, No. 2, pp. 255-264, (Feb. 1, 1992).

* cited by examiner

REDUCED COMPLEXITY SLIDING WINDOW BASED EQUALIZER

CROSS REFERENCE TO RELATED APPLICATION(S)

This application claims priority from U.S. provisional application No. 60/452,165, filed on Mar. 3, 2003, which is incorporated by reference as if fully set forth.

FIELD OF INVENTION

The invention generally relates to wireless communication systems, In particular, the invention relates to data detection in such systems.

BACKGROUND

Due to the increased demands for improved receiver performance, many advanced receivers use zero forcing (ZF) block linear equalizers and minimum mean square error (MMSE) equalizers.

In both these approaches, the received signal is typically modeled per Equation 1.

$$r = Hd + n \qquad \text{Equation 1}$$

r is the received vector, comprising samples of the received signal. H is the channel response matrix. d is the data vector. In spread spectrum systems, such as code division multiple access (CDMA) systems, d is the spread data vector. In CDMA systems, data for each individual code is produced by despreading the estimated data vector d with that code. n is the noise vector.

In a ZF block linear equalizer, the data vector is estimated, such as per Equation 2

$$d = (H)^{-1} r \qquad \text{Equation 2}$$

$(\cdot)^H$ is the complex conjugate transpose (or Hermetian) operation. In a MMSE block linear equalizer, the data vector is estimated, such as per Equation 3.

$$d = (H^H H + \sigma^2 I)^{-1} r \qquad \text{Equation 3}$$

In wireless channels experiencing multipath propagation, to accurately detect the data using these approaches requires that an infinite number of received samples be used. One approach to reduce the complexity is a sliding window approach. In the sliding window approach, a predetermined window of received samples and channel responses are used in the data detection. After the initial detection, the window is slid down to a next window of samples. This process continues until the communication ceases.

By not using an infinite number of samples, an error is introduced into the data detection. The error is most prominent at the beginning and end of the window, where the effectively truncated portions of the infinite sequence have the largest impact. One approach to reduce these errors is to use a large window size and truncate the results at the beginning and the end of the window. The truncated portions of the window are determined in previous and subsequent windows. This approach has considerable complexity. The large window size leads to large dimensions on the matrices and vectors used in the data estimation. Additionally, this approach is not computationally efficient by detection data at the beginning and at the ends of the window and then discarding that data.

Accordingly, it is desirable to have alternate approaches to data detection.

SUMMARY

Data estimation is performed in a wireless communications system. A received vector is produced. For use in estimating a desired portion of data of the received vector, a past, a center and a future portion of a channel estimate matrix is determined. The past portion is associated with a portion of the received signal prior to the desired portion of the data. The future portion is associated with a portion of the received vector after the desired portion of the data and the center portion is associated with a portion of the received vector associated with the desired data portion. The desired portion of the data is estimated without effectively truncating detected data. The estimating the desired portion of the data uses a minimum mean square error algorithm having inputs of the center portion of the channel estimate matrix and a portion of the received vector. The past and future portions of the channel estimate matrix are used to adjust factors in the minimum mean square error algorithm.

BRIEF DESCRIPTION OF THE DRAWING(S)

DETAILED DESCRIPTION OF THE PREFERRED EMBODIMENT(S)

Figure 1:
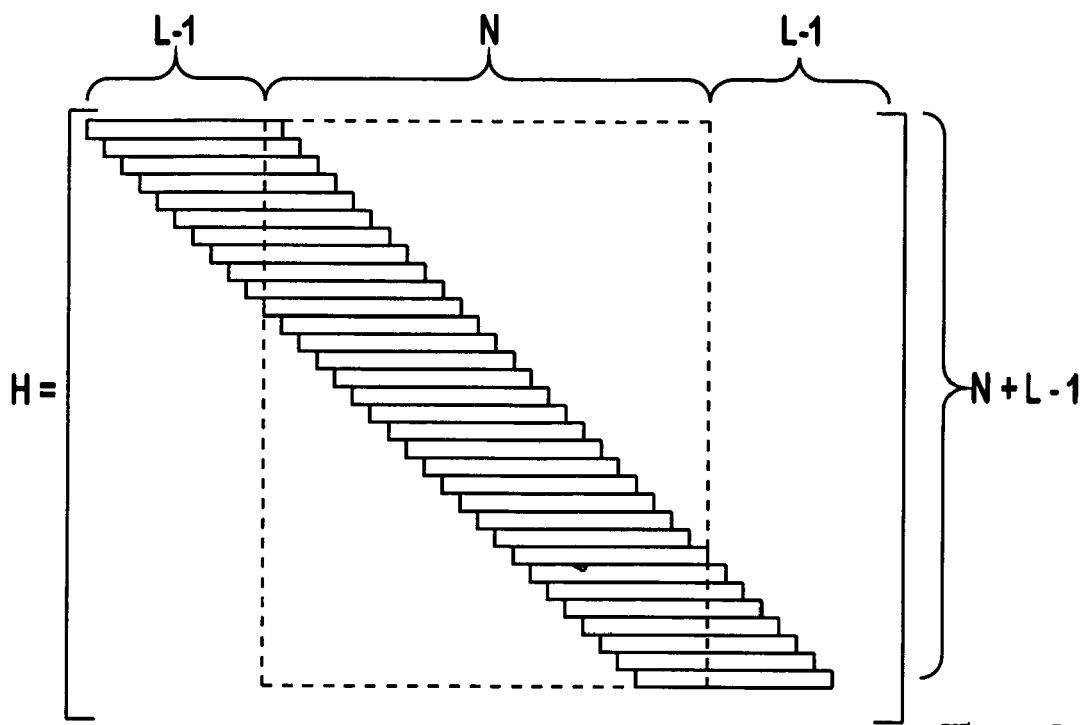
FIG. 1 is an illustration of a banded channel response matrix.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

Although reduced complexity sliding window equalizer is described in conjunction with a preferred wireless code division multiple access communication system, such as CDMA2000 and universal mobile terrestrial system (UMTS) frequency division duplex (FDD), time division duplex (TDD) modes and time division synchronous CDMA (TD-SCDMA), it can be applied to various communication system and, in particular, various wireless communication systems. In a wireless communication system, it can be applied to transmissions received by a WTRU from a base station, received by a base station from one or multiple WTRUs or received by one WTRU from another WTRU, such as in an ad hoc mode of operation.

The following describes the implementation of a reduced complexity sliding window based equalizer using a preferred MMSE algorithm. However, other algorithms can be used, such as a zero forcing algorithm. $h(\cdot)$ is the impulse response of a channel. $d(k)$ is the $k^{th}$ transmitted sample that is generated by spreading a symbol using a spreading code. It can also be sum of the chips that are generated by spreading a set of symbols using a set of codes, such as orthogonal codes. r(·) is the received signal. The model of the system can expressed as per Equation 4.

$$r(t) = \sum_{k=-\infty}^{\infty} d(k)h(t-kT_c) + n(t) \quad -\infty < t < \infty \quad \text{Equation 4}$$

n(t) is the sum of additive noise and interference (intra-cell and inter-cell). For simplicity, the following is described assuming chip rate sampling is used at the receiver, although other sampling rates may be used, such as a multiple of the chip rate. The sampled received signal can be expressed as per Equation 5.

$$r(j) = \sum_{k=-\infty}^{\infty} d(k)h(j-k) + n(j) \quad j \in \{\ldots, -2, -1, 0, 1, 2, \ldots\}$$

$$= \sum_{k=-\infty}^{\infty} d(j-k)h(k) + n(j) \quad \text{Equation 5}$$

$T_c$ is being dropped for simplicity in the notations.

Assuming h(·) has a finite support and is time invariant. This means that in the discrete-time domain, index L exists such that h(i)=0 for i<0 and i≧L. As a result, Equation 5 can be re-written as Equation 6.

$$r(j) = \sum_{k=0}^{L-1} h(k)d(j-k) + n(j) \quad j \in \{\ldots, -2, -1, 0, 1, 2, \ldots\} \quad \text{Equation 6}$$

Considering that the received signal has M received signals r(0), . . . , r(M−1), Equation 7 results.

$$r = Hd + n$$

where, $$r = [r(0), \cdots, r(M-1)]^T \in C^M,$$

$$d = [d(-L+1), d(-L+2), \ldots, d(0), d(1), \ldots, d(M-1)]^T \in C^{M+L-1}$$

$$n = [n(0), \cdots, n(M-1)]^T \in C^M$$

$$H = \begin{bmatrix} h(L-1) & h(L-2) & \cdots & h(1) & h(0) & 0 & \cdots & \cdots \\ 0 & h(L-1) & h(L-2) & \cdots & h(1) & h(0) & 0 & \cdots \\ \vdots & \ddots & \ddots & \ddots & \ddots & \ddots & \ddots & \vdots \\ \cdots & \cdots & 0 & h(L-1) & h(L-2) & \cdots & h(1) & h(0) \end{bmatrix} \in C^{M \times (M+L-1)}$$

Equation 7

Part of the vector d can be determined using an approximate equation. Assuming M>L and defining N=M−L+1, vector d is per Equation 8.

$$d = [\underbrace{d(-L+1), d(-L+2), \ldots, d(-1)}_{L-1}, \underbrace{d(0), d(1), \ldots, d(N-1)}_{N}, \underbrace{d(N), \ldots, d(N+L-2)}_{L-1}]^T \in C^{N+2L-2}$$

The H matrix in Equation 7 is a banded matrix, which can be represented as the diagram in FIG. 1. In FIG. 1, each row in the shaded area represents the vector [h(L−1),h(L−2), . . . , h(1), h(0)], as shown in Equation 7.

Instead of estimating all of the elements in d, only the middle N elements of d are estimated. ď is the middle N elements as per Equation 9.

$$\tilde{d} = [d(0), \ldots, d(N-1)]^T \quad \text{Equation 9}$$

Using the same observation for r, an approximate linear relation between r and ď is per Equation 10.

$$r = \tilde{H}\tilde{d} + n \quad \text{Equation 10}$$

Figure 2:
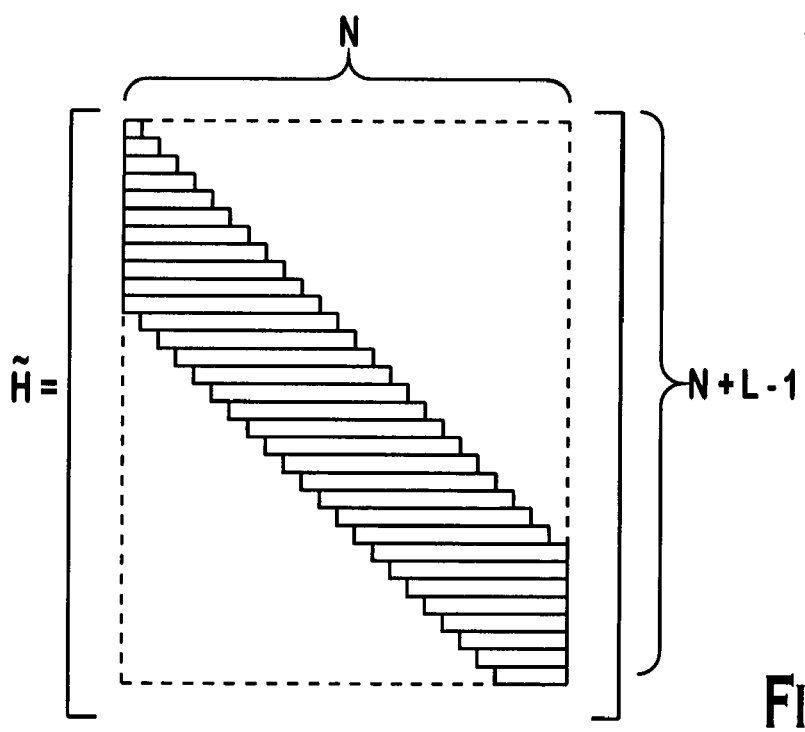
FIG. 2 is an illustration of a center portion of the banded channel response matrix.

Matrix $\tilde{H}$ can be represented as the diagram in FIG. 2 or as per Equation 11.

$$\tilde{H} = \begin{bmatrix} h(0) & 0 & \cdots & \\ h(1) & h(0) & \ddots & \\ \vdots & h(1) & \ddots & 0 \\ h(L-1) & \vdots & \ddots & h(0) \\ 0 & h(L-1) & \ddots & h(1) \\ \vdots & 0 & \ddots & \vdots \\ & & \ddots & h(L-1) \end{bmatrix} \quad \text{Equation 11}$$

As shown, the first L−1 and the last L−1 elements of r are not equal to the right hand side of the Equation 10. As a result, the elements at the two ends of vector ď will be estimated less accurately than those near the center. Due to this property, a sliding window approach is preferably used for estimation of transmitted samples, such as chips.

In each, $k^{th}$ step of the sliding window approach, a certain number of the received samples are kept in r [k] with dimension N+L−1. They are used to estimate a set of transmitted data ď[k] with dimension N using equation 10. After vector ď[k] is estimated, only the "middle" part of the estimated vector ď[k] is used for the further data processing, such as by despreading. The "lower" part (or the later in-time part) of ď[k] is estimated again in the next step of the sliding window process in which r [k+1] has some of the elements r [k] and some new received samples, i.e. it is a shift (slide) version of r [k].

Although, preferably, the window size N and the sliding step size are design parameters, (based on delay spread of the channel (L), the accuracy requirement for the data estimation and the complexity limitation for implementation), the following using the window size of Equation 12 for illustrative purposes.

$$N = 4N_S \times SF \qquad \text{Equation 12}$$

SF is the spreading factor. Typical window sizes are 5 to 20 times larger than the channel impulse response, although other sizes may be used.

Figure 3:
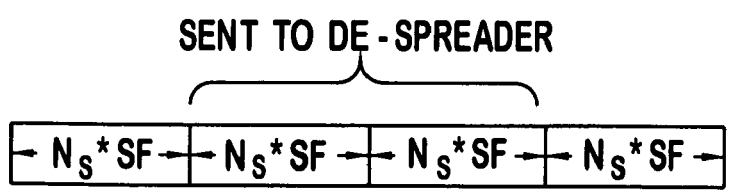
FIG. 3 is an illustration of a data vector window with one possible partitioning.

The sliding step size based on the window size of Equation 12 is, preferably, $2N_S \times SF$. $N_S \in \{1, 2, \ldots\}$ is, preferably, left as a design parameter. In addition, in each sliding step, the estimated chips that are sent to the despreader are $2N_S \times SF$ elements in the middle of the estimated $\hat{d}[k]$. This procedure is illustrated in FIG. 3.

One algorithm of data detection uses an MMSE algorithm with model error correction uses a sliding window based approach and the system model of Equation 10.

Due to the approximation, the estimation of the data, such as chips, has error, especially, at the two ends of the data vector in each sliding step (the beginning and end). To correct this error, the H matrix in Equation 7 is partitioned into a block row matrix, as per Equation 13, (step 50).

$$H = [H_p | \tilde{H} | H_f] \qquad \text{Equation 13}$$

Subscript "p" stands for "past", and "f" stands for "future". H is as per Equation 10. $H_p$ is per Equation 14.

$$H_p = \begin{bmatrix} h(L-1) & h(L-2) & \cdots & h(1) \\ 0 & h(L-1) & \cdots & h(2) \\ \vdots & \ddots & \ddots & \vdots \\ 0 & \cdots & 0 & h(L-1) \\ 0 & \cdots & \cdots & 0 \\ \vdots & \vdots & \vdots & \vdots \\ 0 & \cdots & \cdots & 0 \end{bmatrix} \in C^{(N+L-1) \times (L-1)} \qquad \text{Equation 14}$$

$H_f$ is per Equation 15.

$$H_f = \begin{bmatrix} 0 & \cdots & \cdots & 0 \\ \vdots & \vdots & \vdots & \vdots \\ 0 & \cdots & \cdots & 0 \\ h(0) & 0 & \cdots & 0 \\ \vdots & \ddots & \ddots & 0 \\ h(L-3) & \cdots & h(0) & 0 \\ h(L-2) & h(L-3) & \cdots & h(0) \end{bmatrix} \in C^{(N+L-1) \times (L-1)} \qquad \text{Equation 15}$$

The vector d is also partitioned into blocks as per Equation 16.

$$d = [d_p^T | \tilde{d}^T | d_f^T]^T \qquad \text{Equation 16}$$

$\tilde{d}$ is the same as per Equation 8 and $d_p$ is per Equation 17.

$$d_p = [d(-L+1)d(-L+2) \ldots d(-1)]^T \in C^{L-1} \qquad \text{Equation 17}$$

$d_f$ is per Equation 18.

$$d_f = [d(N)d(N+1) \ldots d(N+L-2)]^T \in C^{L-1} \qquad \text{Equation 18}$$

Figure 4:
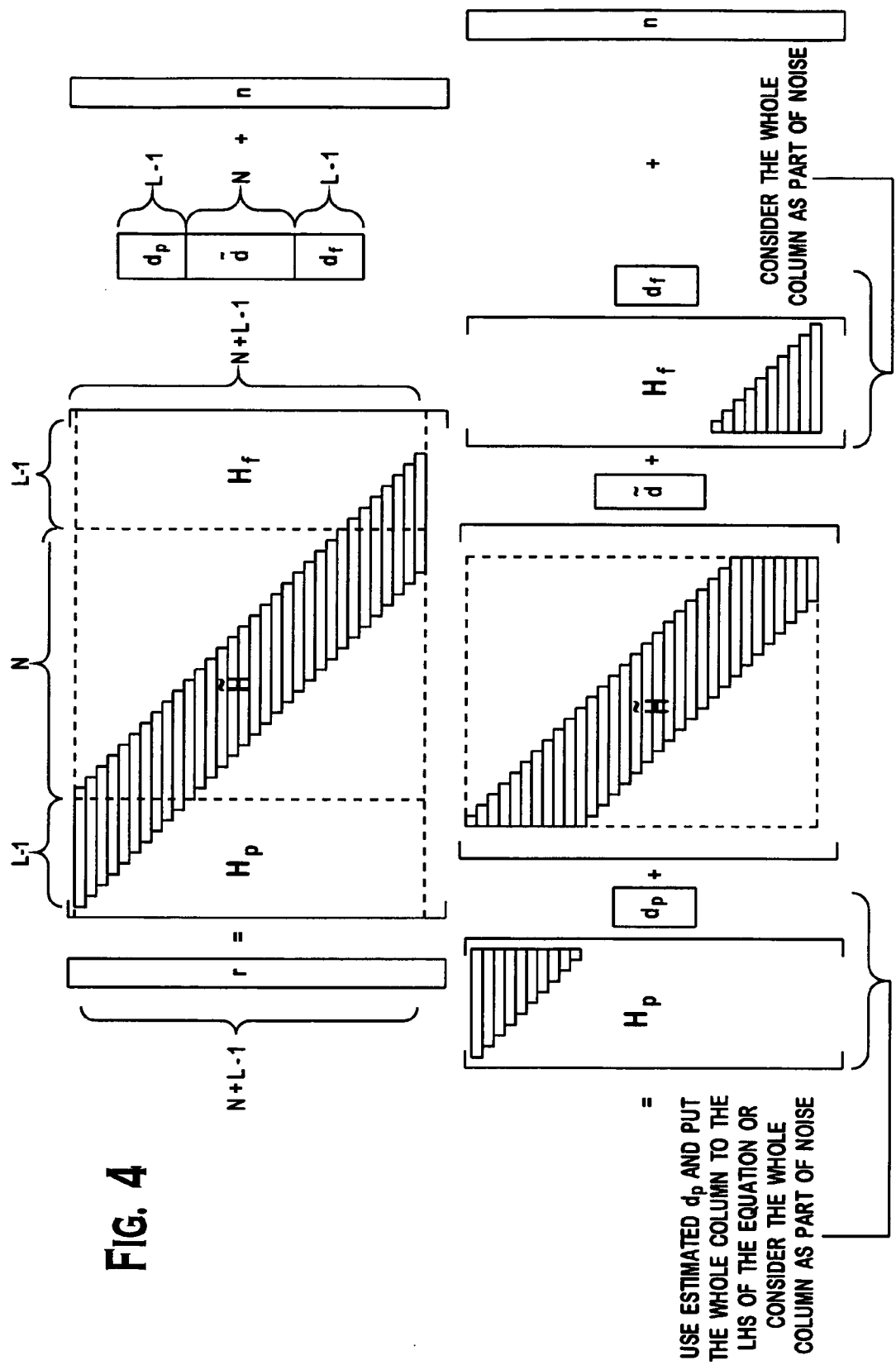
FIG. 4 is an illustration of a partitioned signal model.

The original system model is then per Equation 19 and is illustrated in FIG. 4.

$$r = H_p d_p + \tilde{H} \tilde{d} + H_f d_f + n \qquad \text{Equation 19}$$

One approach to model Equation 19 is per Equation 20.

$$\tilde{r} = \tilde{H}\tilde{d} + \tilde{n}_1$$

where $$\tilde{r} = r - H_p d_p \text{ and } \tilde{n}_1 = H_f d_f + n \qquad \text{Equation 20}$$

Using an MMSE algorithm, the estimated data vector $\tilde{d}$ is per Equation 21.

$$\tilde{d} = g_d \tilde{H}^H (g_d \tilde{H} \tilde{H}^H + \Sigma_1)^{-1} \tilde{r} \qquad \text{Equation 21}$$

In Equation 21, $g_d$ is chip energy per Equation 22.

$$E\{d(i)d^*(j)\} = g_d \delta_{ij} \qquad \text{Equation 22}$$

$\tilde{r}$ is per Equation 23.

$$\tilde{r} = r - H_p d_p \qquad \text{Equation 23}$$

$\hat{d}_p$, is part of the estimation of $\tilde{d}$ in the previous sliding window step. $\Sigma_1$ is the autocorrelation matrix of $\tilde{n}_1$, i.e., $\Sigma^1 = E\{\tilde{n}_1 \tilde{n}_1^H\}$. If assuming $H_f d_f$ and n are uncorrelated, Equation 24 results.

$$\Sigma_1 = g_d H_f H_f^H + E\{nn^H\} \qquad \text{Equation 24}$$

The reliability of $\hat{d}_p$ depends on the sliding window size (relative to the channel delay span L) and sliding step size.

Figure 5:
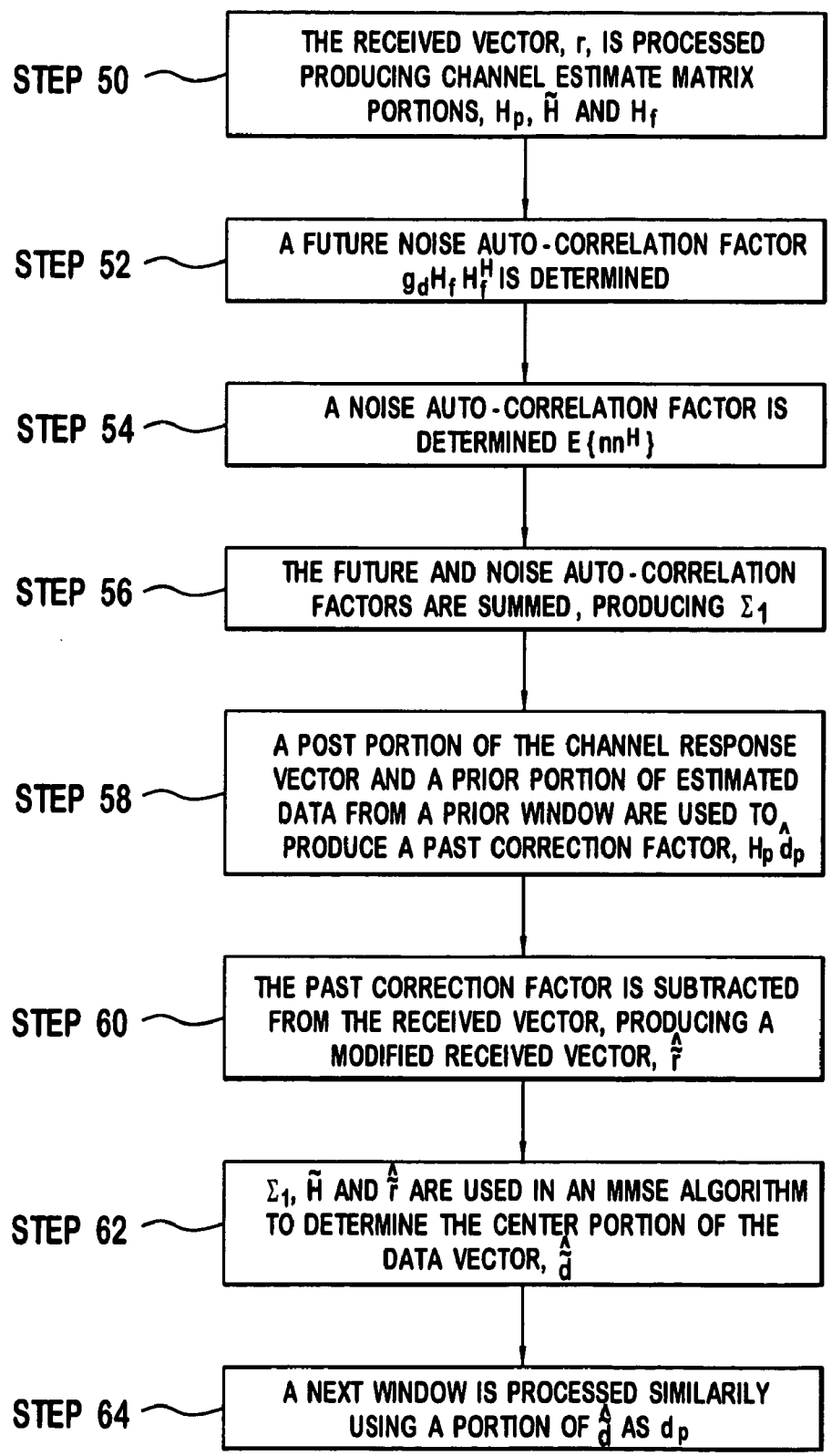
FIG. 5 is a flow diagram of sliding window data detection using a past correction factor.
Figure 6:
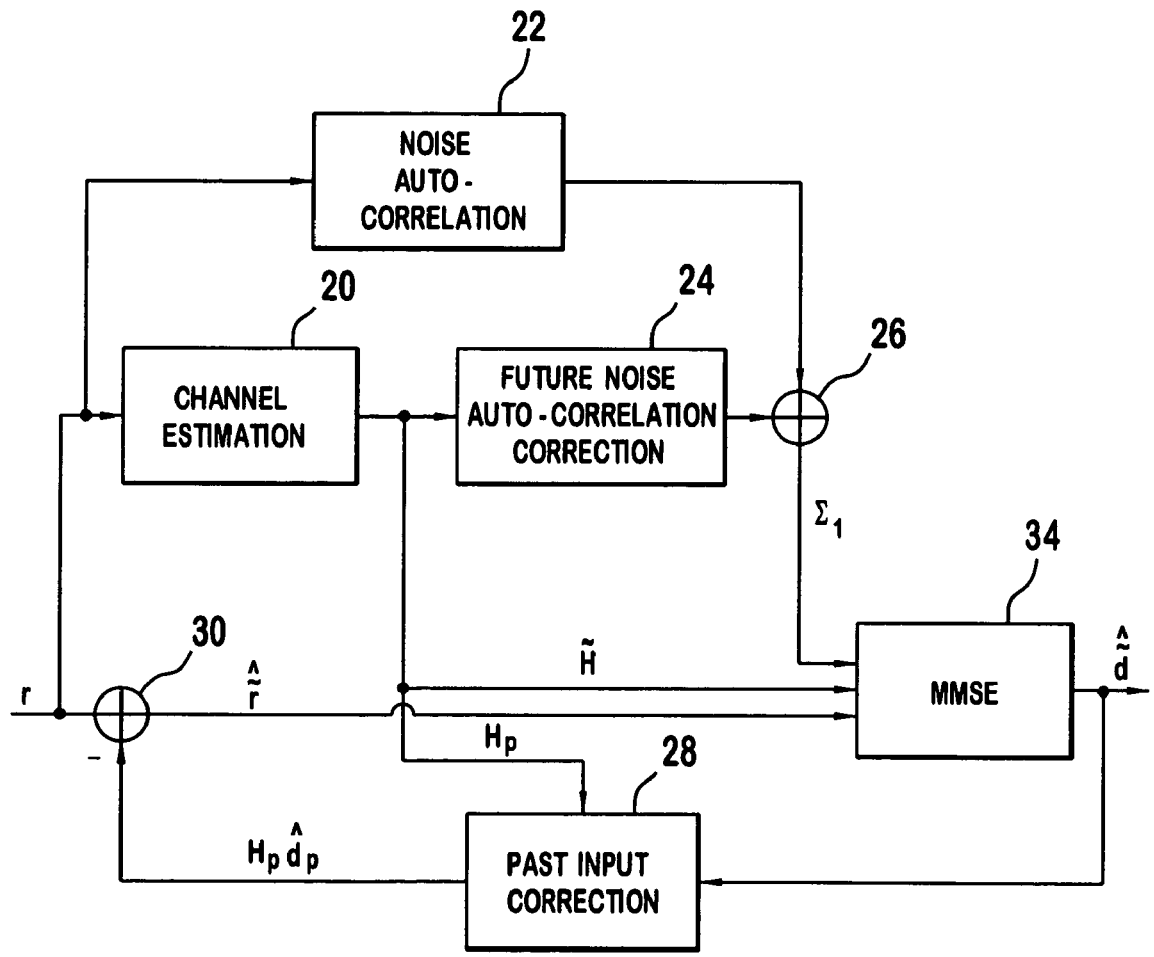
FIG. 6 is a receiver using sliding window data detection using a past correction factor.

This approach is also described in conjunction with the flow diagram of FIG. 5 and preferred receiver components of FIG. 6, which can be implemented in a WTRU or base station. The circuit of FIG. 6 can be implemented on a single integrated circuit (IC), such as an application specific integrated circuit (ASIC), on multiple IC's, as discrete components or as a combination of IC('s) and discrete components.

A channel estimation device 20 processes the received vector r producing the channel estimate matrix portions, $H_p$, $\tilde{H}$ and $H_f$ (step 50). A future noise auto-correlation device 24 determines a future noise auto-correlation factor, $g_d H_f H_f^H$, (step 52). A noise auto-correlation device 22 determines a noise auto-correlation factor, $E\{nn^H\}$, (step 54). A summer 26 sums the two factors together to produce $\Sigma_1$, (step 56).

A past input correction device 28 takes the past portion of the channel response matrix, $H_p$, and a past determined portion of the data vector, $\hat{d}_p$, to produce a past correction factor, $H_p \hat{d}_p$, (step 58). A subtractor 30 subtracts the past correction factor from the received vector producing a modified received vector, $\tilde{r}$, (step 60). An MMSE device 34 uses $\Sigma_1$, $\tilde{H}$, and $\tilde{r}$ to determine the received data vector center portion $\tilde{d}$, such as per Equation 21, (step 62). The next window is determined in the same manner using a portion of $\tilde{d}$ as $\hat{d}_p$ in the next window determination, (step 64). As illustrated in this approach, only data for the portion of interest, $\tilde{d}$, is determined reducing the complexity involved in the data detection and the truncating of unwanted portions of the data vector.

In another approach to data detection, only the noise term is corrected. In this approach, the system model is per Equation 25.

$$r = \tilde{H}\tilde{d} + \tilde{n}_2, \text{ where } \tilde{n}_2 = H_p d_p + H_f d_f + n \qquad \text{Equation 25}$$

Using an MMSE algorithm, the estimated data vector $\tilde{d}$ is per Equation 26.

$$\tilde{d} = g_d \tilde{H}^H (g_d \tilde{H} \tilde{H}^H + \Sigma_2)^{-1} r \qquad \text{Equation 26}$$

Assuming $H_p d_p$, $H_f d_f$ and n are uncorrelated, Equation 27 results.

$$\Sigma_2 = g_d H_p H_p^H + g_d H_f H_f^H + E\{nn^H\} \qquad \text{Equation 27}$$

To reduce the complexity in solving Equation 26 using Equation 27, a full matrix multiplication for $H_p H_p^H$ and $H_f H_f^H$ are not necessary, since only the upper and lower corner of $H_p$ and $H_f$, respectively, are non-zero, in general.

Figure 7:
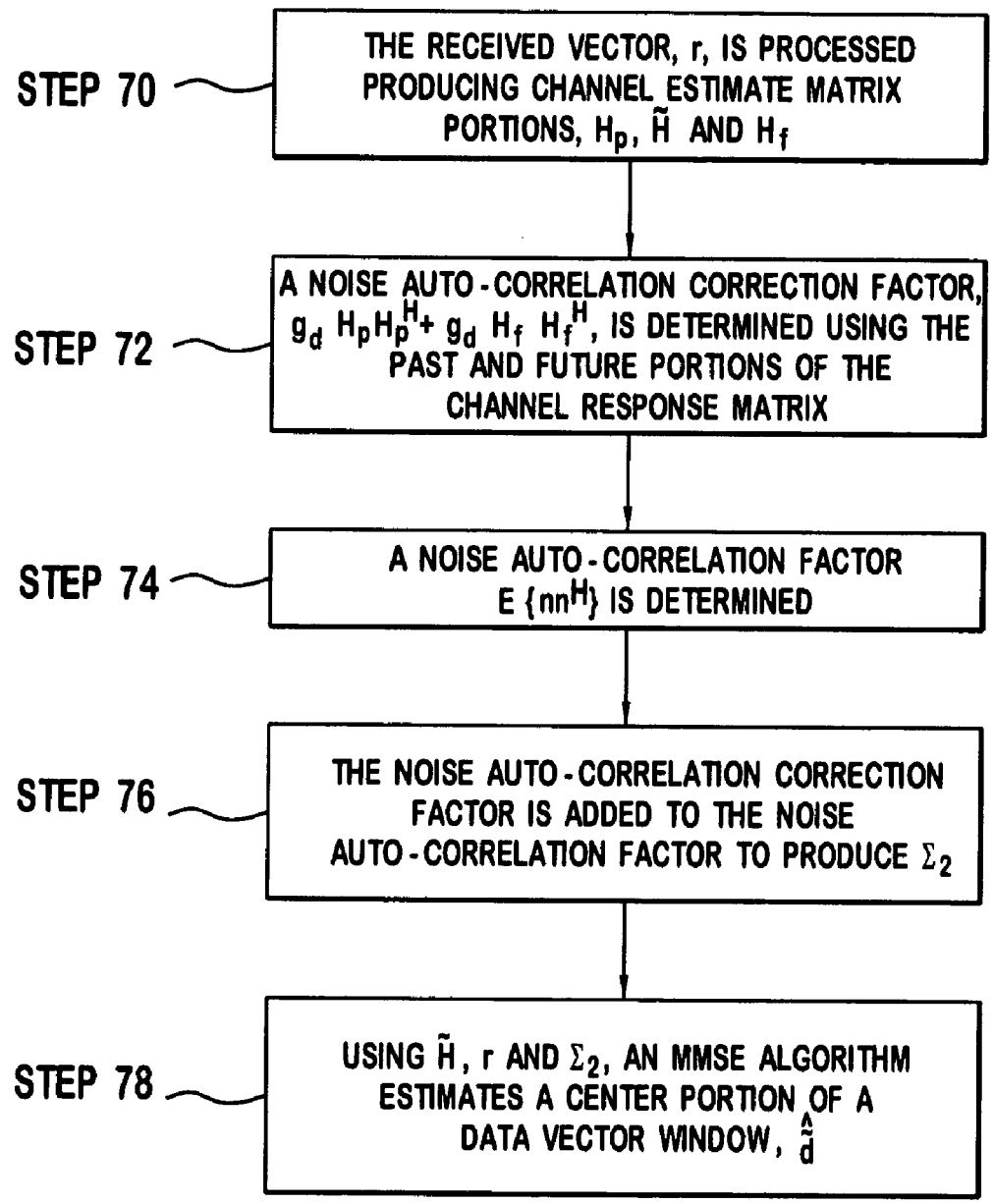
FIG. 7 is a flow diagram of sliding window data detection using a noise auto-correlation correction factor.
Figure 8:
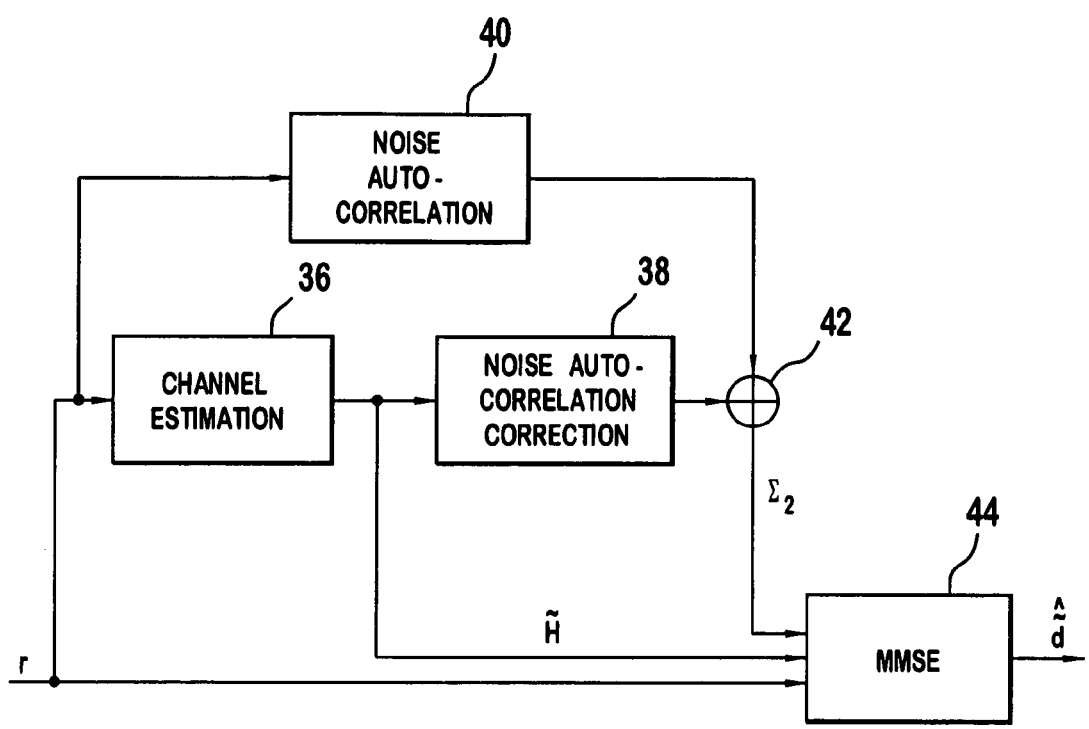
FIG. 8 is a receiver using sliding window data detection using a noise auto-correlation correction factor.

This approach is also described in conjunction with the flow diagram of FIG. 7 and preferred receiver components of FIG. 8, which can be implemented in a WTRU or base station. The circuit of FIG. 8 can be implemented on a single integrated circuit (IC), such as an application specific integrated circuit (ASIC), on multiple IC's, as discrete components or as a combination of IC('s) and discrete components.

A channel estimation device 36 processes the received vector producing the channel estimate matrix portions, $H_p$, H and $H_f$ (step 70). A noise auto-correlation correction device 38 determines a noise auto-correlation correction factor, $g_d H_p H_p^H + g_d H_f H_f^H$, using the future and past portions of the channel response matrix, (step 72). A noise auto correlation device 40 determines a noise auto-correlation factor, $E\{nn^H\}$, (step 74). A summer 42 adds the noise auto-correlation correction factor to the noise auto-correlation factor to produce $\Sigma_2$, (step 76). An MMSE device 44 uses the center portion or the channel response matrix, H, the received vector, r, and $\Sigma_2$ to estimate the center portion of the data vector, d̆, (step 78). One advantage to this approach is that a feedback loop using the detected data is not required. As a result, the different slided window version can be determined in parallel and not sequentially.

What is claimed is:

1. A method for data estimation in wireless communications, the method comprising:
   producing a received vector;
   determining a past, a center and a future portion of a channel estimate matrix for a desired portion of the data of the received vector, the past portion associated with a portion of the received signal prior to the desired portion of the data, the future portion associated with a portion of the received vector after the desired portion of the data and the center portion associated with a portion of the received vector associated with the desired data portion;
   estimating the desired portion of the data without effectively truncating detected data using a minimum mean square error algorithm having inputs of the center portion of the channel estimate matrix and a portion of the received vector;
   using the past and future portions of the channel estimate matrix for adjusting factors in the minimum mean square error algorithm; and
   adjusting the received vector prior to input into the minimum mean square error algorithm using the past portion of the channel estimate matrix and data previously estimated for a portion of the received vector associated with the past portion of the channel estimate matrix.

2. The method of claim 1 wherein the received vector comprises at least one code division multiple access signal and the estimated desired portion of the data produces a portion of a spread data vector.

3. The method of claim 1 wherein the adjusting the received vector is by subtracting a multiplication of the past portion of the channel estimate matrix with the previously estimated data from the received vector.

4. The method of claim 1 wherein the data estimation is performed using a sliding window approach and the desired portion of data of the received vector is a center portion of the window.

5. A method for data estimation in wireless communications, the method comprising:
   producing a received vector;
   determining a past, a center and a future portion of a channel estimate matrix for a desired portion of the data of the received vector, the past portion associated with a portion of the received signal prior to the desired portion of the data, the future portion associated with a portion of the received vector after the desired portion of the data and the center portion associated with a portion of the received vector associated with the desired data portion;
   estimating the desired portion of the data without effectively truncating detected data using a minimum mean square error algorithm having inputs of the center portion of the channel estimate matrix and a portion of the received vector;
   using the past and future portions of the channel estimate matrix for adjusting factors in the minimum mean square error algorithm; and
   producing a noise factor using the prior channel estimate matrix, the future channel estimate matrix and an auto correlation of the noise and the inputs into the minimum mean square error algorithm are the noise factor, the center portion of the channel estimate matrix and the portion of the received vector.

6. A wireless transmit/receive unit comprising:
   a receiver component configured to produce a received vector;
   a matrix determination component configured to determine a past, a center and a future portion of a channel estimate matrix of a desired portion of data of the received vector, the past portion associated with a portion of the received signal prior to the desired portion of the data, the future portion associated with a portion of the received vector after the desired portion of the data and the center portion associated with a portion of the received vector associated with the desired data portion;
   a data estimation component configured to estimate the desired portion of the data without effectively truncating detected data, the estimating the desired portion of the data uses a minimum mean square error algorithm having inputs of the center portion of the channel estimate matrix and a portion of the received vector;
   the data estimation component configured to use the past and future portions of the channel estimate matrix for adjusting factors in the minimum mean square error algorithm; and
   the data estimation component configured to adjust the received vector prior to input into the minimum mean square error algorithm using the past portion of the channel estimate matrix and data previously estimated for a portion of the received vector associated with the past portion of the channel estimate matrix.

7. The wireless transmit/receive unit of claim 6 wherein the receiver component is configured to produce a received vector that comprises at least one code division multiple access signal and the data estimation component is configured to estimate the desired portion of the data to produce a portion of a spread data vector.

8. The wireless transmit/receive unit of claim 6 wherein the data estimation component is configured to adjust the received vector by subtracting a multiplication of the past portion of the channel estimate matrix with the previously estimated data from the received vector.

9. The wireless transmit/receive unit of claim 6 wherein the data estimation component configured to estimate data using a sliding window approach where the desired portion of data of the received vector is a center portion of the window.

10. A wireless transmit/receive unit comprising:
   a receiver component configured to produce a received vector;
   a matrix determination component configured to determine a past, a center and a future portion of a channel estimate matrix of a desired portion of data of the received vector, the past portion associated with a portion of the received signal prior to the desired portion of the data, the future portion associated with a portion of the received vector after the desired portion of the data and the center portion associated with a portion of the received vector associated with the desired data portion;

a data estimation component configured to estimate the desired portion of the data without effectively truncating detected data, the estimating the desired portion of the data uses a minimum mean square error algorithm having inputs of the center portion of the channel estimate matrix and a portion of the received vector;

the data estimation component configured to use the past and future portions of the channel estimate matrix for adjusting factors in the minimum mean square error algorithm; and a component configured to produce a noise factor using the prior channel estimate matrix, the future channel estimate matrix and an auto correlation of the noise and the inputs into the minimum mean square error algorithm are the noise factor, the center portion of the channel estimate matrix and the portion of the received vector.

11. A wireless transmit/receive unit configured to receive at least one signal and to produce a received vector therefrom, the wireless transmit/receive unit comprising:

a channel estimation matrix device configured to determine a past, a center and a future portion of a channel estimate matrix of a desired portion of data of the received vector, the past portion associated with a portion of the received signal prior to the desired portion of the data, the future portion associated with a portion of the received vector after the desired portion of the data and the center portion associated with a portion of the received vector associated with the desired data portion;

a minimum mean square error device configured to estimate the desired portion of the data without effectively truncating detected data using a minimum mean square error algorithm having inputs of the center portion of the channel estimate matrix and a portion of the received vector, wherein the past and future portions of the channel estimate matrix are used for adjusting factors in the minimum mean square error algorithm; and an adjustment device configured to adjust the received vector prior to input into the minimum mean square error device by using the past portion of the channel estimate matrix and data previously estimated for a portion of the received vector associated with the past portion of the channel estimate matrix.

12. The wireless transmit/receive unit of claim 11 wherein the received vector comprises at least one code division multiple access signal and the minimum mean square error device configured to estimate the desired portion of the data to produce a portion of a spread data vector.

13. The wireless transmit/receive unit of claim 11 wherein the adjustment device is configured to adjust the received vector by subtracting a multiplication of the past portion of the channel estimate matrix with the previously estimated data from the received vector.

14. The wireless transmit/receive unit of claim 11 wherein the minimum mean square error device configured to estimate the data using a sliding window approach where the desired portion of data of the received vector is a center portion of the window.

15. A wireless transmit/receive unit configured to receive at least one signal and to produce a received vector therefrom, the wireless transmit/receive unit comprising:

a channel estimation matrix device configured to determine a past, a center and a future portion of a channel estimate matrix of a desired portion of data of the received vector, the past portion associated with a portion of the received signal prior to the desired portion of the data, the future portion associated with a portion of the received vector after the desired portion of the data and the center portion associated with a portion of the received vector associated with the desired data portion;

a minimum mean square error device configured to estimate the desired portion of the data without effectively truncating detected data using a minimum mean square error algorithm having inputs of the center portion of the channel estimate matrix and a portion of the received vector, wherein the past and future portions of the channel estimate matrix are used for adjusting factors in the minimum mean square error algorithm; and a noise factor device configured to produce a noise factor using the prior channel estimate matrix, the future channel estimate matrix and an auto correlation of the noise and the inputs into the minimum mean square error algorithm are the noise factor, the center portion of the channel estimate matrix and the portion of the received vector.

16. A base station comprising:

a receiver component configured to produce a received vector;

a matrix determination component configured to determine a past, a center and a future portion of a channel estimate matrix of a desired portion of data of the received vector, the past portion associated with a portion of the received signal prior to the desired portion of the data, the future portion associated with a portion of the received vector after the desired portion of the data and the center portion associated with a portion of the received vector associated with the desired data portion;

a data estimation component configured to estimate the desired portion of the data without effectively truncating detected data, the estimating the desired portion of the data uses a minimum mean square error algorithm having inputs of the center portion of the channel estimate matrix and a portion of the received vector;

the data estimation component configured to use the past and future portions of the channel estimate matrix for adjusting factors in the minimum mean square error algorithm; and the data estimation component configured to adjust the received vector is prior to input into the minimum mean square error algorithm using the past portion of the channel estimate matrix and data previously estimated for a portion of the received vector associated with the past portion of the channel estimate matrix.

17. The base station of claim 16 wherein the receiver component is configured to produce a received vector that comprises at least one code division multiple access signal and the data estimation component is configured to estimate the desired portion of the data to produce a portion of a spread data vector.

18. The base station of claim 16 wherein the data estimation component is configured to adjust the received vector is by subtracting a multiplication of the past portion of the channel estimate matrix with the previously estimated data from the received vector.

19. The base station of claim 16 wherein the data estimation component configured to estimate data using a sliding window approach where data estimation is performed using a sliding window approach and the desired portion of data of the received vector is a center portion of the window.

20. A base station comprising:
a receiver component configured to produce a received vector;
a matrix determination component configured to determine a past, a center and a future portion of a channel estimate matrix of a desired portion of data of the received vector, the past portion associated with a portion of the received signal prior to the desired portion of the data, the future portion associated with a portion of the received vector after the desired portion of the data and the center portion associated with a portion of the received vector associated with the desired data portion;
a data estimation component configured to estimate the desired portion of the data without effectively truncating detected data, the estimating the desired portion of the data uses a minimum mean square error algorithm having inputs of the center portion of the channel estimate matrix and a portion of the received vector;
the data estimation component configured to use the past and future portions of the channel estimate matrix for adjusting factors in the minimum mean square error algorithm; and
a component configured to produce a noise factor using the prior channel estimate matrix, the future channel estimate matrix and an auto correlation of the noise and the inputs into the minimum mean square error algorithm are the noise factor, the center portion of the channel estimate matrix and the portion of the received vector.

21. A base station configured to receive at least one signal and to produce a received vector therefrom, the wireless transmit/receive unit comprising:
a channel estimation matrix device configured to determine a past, a center and a future portion of a channel estimate matrix of a desired portion of data of the received vector, the past portion associated with a portion of the received signal prior to the desired portion of the data, the future portion associated with a portion of the received vector after the desired portion of the data and the center portion associated with a portion of the received vector associated with the desired data portion;
a minimum mean square error device configured to estimate the desired portion of the data without effectively truncating detected data using a minimum mean square error algorithm having inputs of the center portion of the channel estimate matrix and a portion of the received vector, wherein the past and future portions of the channel estimate matrix are used for adjusting factors in the minimum mean square error algorithm; and
an adjustment device configured to adjust the received vector prior to input into the minimum mean square error device by using the past portion of the channel estimate matrix and data previously estimated for a portion of the received vector associated with the past portion of the channel estimate matrix.

22. The base station of claim 21 wherein the received vector comprises at least one code division multiple access signal and the minimum mean square error device configured to estimate the desired portion of the data to produce a portion of a spread data vector.

23. The base station of claim 21 wherein the adjustment device is configured to adjust the received vector by subtracting a multiplication of the past portion of the channel estimate matrix with the previously estimated data from the received vector.

24. The base station of claim 21 wherein the minimum mean square error device is configured to estimate the data using a sliding window approach where the desired portion of data of the received vector is a center portion of the window.

25. A base station configured to receive at least one signal and to produce a received vector therefrom, the wireless transmit/receive unit comprising:
a channel estimation matrix device configured to determine a past, a center and a future portion of a channel estimate matrix of a desired portion of data of the received vector, the past portion associated with a portion of the received signal prior to the desired portion of the data, the future portion associated with a portion of the received vector after the desired portion of the data and the center portion associated with a portion of the received vector associated with the desired data portion;
a minimum mean square error device configured to estimate the desired portion of the data without effectively truncating detected data using a minimum mean square error algorithm having inputs of the center portion of the channel estimate matrix and a portion of the received vector, wherein the past and future portions of the channel estimate matrix are used for adjusting factors in the minimum mean square error algorithm; and
a noise factor device configured to produce a noise factor using the prior channel estimate matrix, the future channel estimate matrix and an auto correlation of the noise and the inputs into the minimum mean square error algorithm are the noise factor, the center portion of the channel estimate matrix and the portion of the received vector.

26. An integrated circuit comprising:
an input configured to receive a received vector;
a channel estimation device producing a prior, center and future portion of a channel response matrix using the received vector;
a future noise auto-correlation device for receiving the future portion of the channel response matrix and producing a future noise auto-correlation factor;
a noise auto-correlation device producing a noise auto-correlation factor using the received vector;
a summer for summing the future noise auto-correlation factor with the noise auto-correlation factor;
a past input correction device for receiving the prior portion of the channel response matrix and prior detected data to produce a past input correction factor;
a subtractor subtracting the past input correction factor from the received vector; and
a minimum mean square error device for receiving an output of the summer, an output of the subtractor and the center portion of the channel estimate matrix, the minimum mean square error device producing estimated data.

27. An integrated circuit comprising:
an input configured to receive a received vector;
a channel estimation device producing a prior, center and future portion of a channel response matrix using the received vector;
a noise auto-correlation correction device for receiving the future and prior portions of the channel response matrix and producing a noise auto-correlation correction factor;
a noise auto-correlation device producing a noise auto-correlation factor using the received vector;
a summer for summing the noise auto-correlation factor with the noise auto-correlation correction factor;
a minimum mean square error device for receiving an output of the summer, the center portion of the channel estimate matrix and the received vector, the minimum mean square error device producing estimated data.

* * * * *

UNITED STATES PATENT AND TRADEMARK OFFICE
CERTIFICATE OF CORRECTION

| | |
|---|---|
| PATENT NO. | : 7,428,279 B2 |
| APPLICATION NO. | : 10/791244 |
| DATED | : September 23, 2008 |
| INVENTOR(S) | : Yang et al. |

It is certified that error appears in the above-identified patent and that said Letters Patent is hereby corrected as shown below:

ON THE TITLE PAGE

Item -56-, U.S. PATENT DOCUMENTS, page 2, left column, after line beginning with "6,128,276" delete "6,137,843  A  10/2000  Chennakeshu et al.".

Item -56-, U.S. PATENT DOCUMENTS, page 2, left column, delete line beginning with "6,137,848" and insert therefor --6,137,848  A  10/2000  Chennakeshu et al.--.

Item -56-, U.S. PATENT DOCUMENTS, page 2, right column, delete line 1, and insert therefor --2003/0026201  A1  2/2003  Arnesen--.

Item -56-, FOREIGN PATENT DOCUMENTS, page 2, right column, after line beginning with "EP 1 139 632" delete "EP  1139623  10/2001" and insert therefor --EP  1139632  10/2001--.

Item -56-, FOREIGN PATENT DOCUMENTS, page 3, left column, after line beginning with "WO  01/47203  A2" insert --WO  01/52489  7/2001--.

Item -56-, FOREIGN PATENT DOCUMENTS, page 3, left column, after line beginning with "WO  01/54305" delete "WO  01/54305  A2  7/2001" and insert therefor --WO  01/54305  A1  7/2001--.

Item -56-, FOREIGN PATENT DOCUMENTS, page 3, left column, after line beginning with "WO  02/054537" delete "WO  02/09977  4/2002".

At column 1, line 9, before the word "which" insert
--provisional application No. 60/482,333, dated Jun. 25, 2003--.

At column 1, line 41, after the words "transpose (or", delete "Hermetian)" and insert therefor --Hermitian)--.

At column 1, line 65, before the word "data" delete "detection" and insert therefor --detecting--.

UNITED STATES PATENT AND TRADEMARK OFFICE
CERTIFICATE OF CORRECTION

PATENT NO. : 7,428,279 B2
APPLICATION NO. : 10/791244
DATED : September 23, 2008
INVENTOR(S) : Yang et al.

It is certified that error appears in the above-identified patent and that said Letters Patent is hereby corrected as shown below:

At column 2, line 16, before the words "the desired", delete "estimating" and insert therefor --estimation of--.

At column 2, line 56, after the word "communication", delete "system" and insert therefor --systems--.

At column 3, line 1, after the word "be", insert --the--.

At column 5, line 19, after the word "correction", delete "uses" and insert therefor --using--.

At column 6, line 19, before the words "If assuming", delete " $\Sigma^1 = E\{\tilde{n}_1 \tilde{n}_1^H\}$ " and insert therefor -- $\Sigma_1 = E\{\tilde{n}_1 \tilde{n}_1^H\}$ --.

At column 6, line 65, after "$H_p H_p^H$ and" delete "$H^f H_f^H$" and insert therefor --$H_f H_f^H$--.

At claim 6, column 8, line 32, before the words "the desired", delete "estimating" and insert therefor --estimation of--.

At claim 10, column 9, line 8, before the words "the desired", delete "estimating" and insert therefor --estimation of--.

At claim 16, column 10, line 38, before the words "the desired", delete "estimating" and insert therefor --estimation of--.

At claim 16, column 10, line 47, before the words "prior to", delete "is".

At claim 18, column 10, line 59, after the word "vector", delete "is".

UNITED STATES PATENT AND TRADEMARK OFFICE
CERTIFICATE OF CORRECTION

PATENT NO. : 7,428,279 B2
APPLICATION NO. : 10/791244
DATED : September 23, 2008
INVENTOR(S) : Yang et al.

It is certified that error appears in the above-identified patent and that said Letters Patent is hereby corrected as shown below:

At claim 20, column 11, line 15, before the words "the desired", delete "estimating" and insert therefor --estimation of--.

Signed and Sealed this

Ninth Day of June, 2009

JOHN DOLL
*Acting Director of the United States Patent and Trademark Office*